Jan. 17, 1950 A. C. WARING 2,494,598
HYDRAULIC PACKING AND SEAL
Filed June 16, 1947
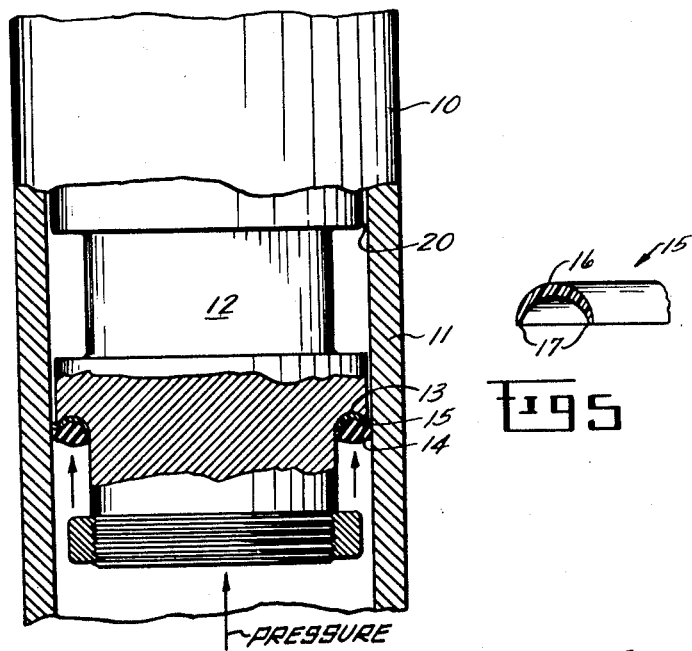
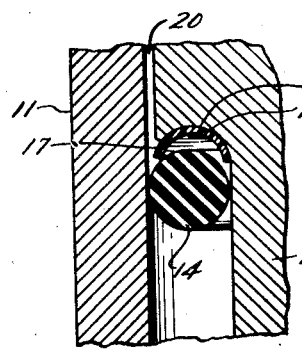
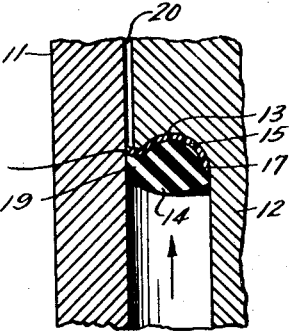
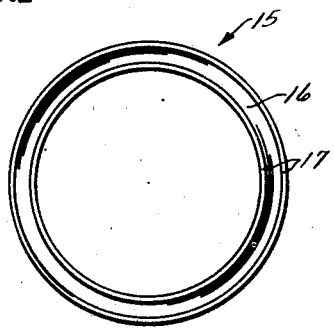
INVENTOR
ALFRED C. WARING
BY
HIS ATTORNEYS Patented Jan. 17, 1950

2,494,598

UNITED STATES PATENT OFFICE 2,494,598

HYDRAULIC PACKING AND SEAL

Alfred C. Waring, Dayton, Ohio

Application June 16, 1947, Serial No. 755,010

2 Claims. (Cl. 309—23)

(Granted under the act of March 3, 1883, as amended April 30, 1928; 370 O. G. 757)

The invention described herein may be manufactured and used by or for the Government for governmental purposes without payment to me of any royalty thereon.

This invention relates to a packing especially suitable for high-pressure hydraulic use.

One object of the invention is to provide a packing that will not leak, if properly installed, at pressures of approximately 3,000 p. s. i. and sometimes much higher.

Another object is to provide a packing that will not score highly polished cylinders or in turn, will not be chipped by cylinder surfaces of somewhat lesser smoothness.

Another object is to provide a packing which employs rubber in a protected position so that the rubber cannot be squeezed past the element that it is intended to obturate.

In the accompanying drawings:

Fig. 1 is a hydraulic cylinder, partly shown in vertical section, in which my packing has been installed. The packing is shown sectioned vertically.

Fig. 2 is a fragmentary view corresponding to the left side of Fig. 1, showing the packing assembled in section before pressure has been put upon it.

Fig. 3 is a fragmentary view corresponding to Fig. 2 showing the effect of pressure on the packing.

Fig. 4 is a plan view of the grooved ring member of the packing.

Fig. 5 is a sectioned isometric view of the grooved ring member shown in Fig. 4.

In Fig. 1, 10 is a hydraulic cylinder and in Figs. 1, 2 and 3, 11 is the sectioned wall thereof. 12 is a hydraulic piston, the cross-hatched area of which indicates vertical sectioning. Encircling the piston 12 at the cross-hatched area, there is a shoulder 13, which is semi-circularly grooved to face the direction from which the hydraulic pressure is to come. The arrows in Fig. 1 indicate the direction of the hydraulic pressure.

My packing consists of an oil-proof rubber ring 14 (Fig. 2) of circular cross section and a grooved circular ring 15 of smaller section diameter but of equal diameter otherwise. The ring 15 is preferably thicker at the middle 16 and thinner at the edges 17 as shown in Fig. 5, but may have the uniform thickness section shown in Figs. 1, 2 and 3. It is important that the ring 15 be made of a material of extreme toughness which is also fairly soft, flexible and non-porous. Such a material is "Teflon" a polymerized tetra-fluoro-ethylene plastic made by the E. I. du Pont Co. It is believed to have the structural formula:

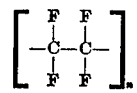

which indicates that the exact degree of polymerization is unknown. It is extremely heat resistant. This material is the preferred one.

Certain other plastics in their toughest and highest melting grades may be used instead of "Teflon." These equivalents are polyethylene or vinyl chlorides, fluorides or mixtures of them.

The ring 14 may be made of "neoprene" or "Buna S" rubber which latter is also known as "GRS." Any rubber of extreme toughness, softness and which is oil-proof as regards mineral and castor oil will be satisfactory. If a mixture of castor oil and alcohol is the only fluid that will be encountered in service, then natural rubber will do.

The section diameter of the ring 14 should be from 10% to 25% greater than the section diameter of the groove 16 in the ring 15. The reason for this requirement is that the pressure can then provide a considerable length of rubber which bears on the inner surface of the cylinder 10. This effect can be seen in Figs. 1 and 3. In these figures, especially in Fig. 3, it will be seen that a plastic lip 18 is produced by the hydraulic pressure forcing out one of the edges 17 into the clearance 20 between the piston 12 and the cylinder 10. The lip 18 prevents the rubber bearing surface 19 from flowing into the clearance space 20 while the bearing surface 19 provides the close sealing action that is impossible to the plastic ring 15. Therefore the rings co-operate to produce a unitary result. If the rubber sealing ring 14 were not definitely larger than the supporting grooved ring 15, then there would not be any substantial length of bearing surface 19.

For comparatively low hydraulic pressures it is possible to obtain fairly satisfactory service from leather grooved rings 15 used in conjunction with synthetic rubber rings 14. For pressures up to 1,000 p. s. i., the results from such a combination will still be better than those heretofore known, both as regards length of service and tightness of seal. For higher pressures however, the results obtained by the use of the plastics herein described as a material for the rings 15 are far superior to those obtained by using leather.

While this packing is intended to make a seal primarily against hydraulic pressure at ordinary temperatures, it is also adapted to seal steam and air pressures. At superheated steam temperatures, only "Teflon" is the recommended material for the ring 15.

I claim as my invention:

1. In combination in a seal against fluid pressure, a semi-circularly-grooved first seal ring of heat-resisting non-porous tough flexible plastic material, a solid rubber second seal ring having a substantially larger radius of sectional curvature than that of the first seal ring, the second seal ring nesting into the first seal ring, the rubber ring being disposed between the plastic ring and the pressure transmitting fluid so that under pressure the rubber ring deforms to fit the plastic ring and the plastic ring deforms to support the rubber ring.

2. A seal according to claim 1 in which the rubber seal ring is from 10% to 25% larger in section diameter than the plastic semi-circularly grooved seal ring.

ALFRED C. WARING.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,427,787 | Hunter | Sept. 23, 1947 |

FOREIGN PATENTS

| Number | Country | Date |
|---|---|---|
| 183,579 | Germany | Oct. 17, 1906 |